United States Patent

Gaven et al.

[15] 3,690,678

[45] Sept. 12, 1972

[54] CASSETTE AND DICTATING MACHINE FOR BELT TYPE RECORDS

[72] Inventors: Thomas J. Gaven, Livingston; Bruce N. Whitlock, Morris Plains, both of N.J.

[73] Assignee: McGraw-Edison Company, Elgin, Ill.

[22] Filed: Sept. 9, 1969

[21] Appl. No.: 856,276

[52] U.S. Cl................274/4 J, 179/100.2 Z, 226/90, 226/180, 226/181, 226/186, 274/4 B

[51] Int. Cl....G11b 23/06, G11b 15/24, G11b 21/16

[58] Field of Search......274/4 J, 4 B, 4 C, 17, 20–22; 179/100.2 Z; 242/197–200; 353/120; 226/180, 181, 186, 90

[56] References Cited

UNITED STATES PATENTS

| | | | |
|---|---|---|---|
| 3,522,594 | 8/1970 | Gabor | 274/4 F UX |
| 2,670,212 | 2/1954 | Heller | 274/4 A X |
| 2,867,389 | 1/1959 | Viets | 179/100.2 Z |
| 2,424,697 | 7/1947 | Lear | 179/100.2 Z |
| 2,482,887 | 9/1949 | Wade | 179/100.2 Z |
| 3,218,080 | 11/1965 | Best | 274/17 |
| 3,390,884 | 7/1968 | Helm | 274/17 |
| 3,492,005 | 1/1970 | Ueno | 179/100.2 Z |
| 3,238,842 | 3/1966 | Wiklund | 274/4 J |
| 3,460,782 | 8/1969 | Findeilsen | 274/4 C |
| 3,394,898 | 7/1968 | Laa | 274/4 E |

FOREIGN PATENTS OR APPLICATIONS

| | | | |
|---|---|---|---|
| 32,655 | 5/1967 | Japan | 274/4 E |

*Primary Examiner*—Leonard Forman
*Assistant Examiner*—Dennis A. Dearing
*Attorney*—George H. Fritzinger

[57] ABSTRACT

A cassette for belt record type dictating machines comprises a flat rectangular box with means supporting a magnetic belt record for revolving movement. The cassette has an opening for a drive coupling with the record and has a transverse opening for traveling engagement of a recorder-reproducer head with the record. The dictating machine is adapted for receiving the cassette and for causing the drive means to become coupled to the belt record and the traveling head to slidably engage the record when the cassette reaches a mounted position and is latched.

2 Claims, 8 Drawing Figures

INVENTORS
THOMAS J. GAVEN
BRUCE N. WHITLOCK
BY George H Fritzinger
AGENT

INVENTORS
THOMAS J. GAVEN
BRUCE N. WHITLOCK
BY
AGENT

INVENTORS
THOMAS J. GAVEN
BRUCE N. WHITLOCK
BY George H. Fritzinger
AGENT

CASSETTE AND DICTATING MACHINE FOR BELT TYPE RECORDS

Heretofore, belt record type dictating machines have used belt records in a free unprotected state. These belt records which are wide tapes of thin plastic material coated with a magnetic material, have very little body strength and stiffness to prevent them from being crimped, wrinkled or creased out of shape during ordinary handling and during mounting and removal into and from the machines. Also, when unprotected, the records pick up dirt and may become scratched to cause excessive head wear and voice dropouts. Except for this wear and tear from handling these belt records would last almost indefinitely because during use the records are driven as by frictional contact while a traveling head has a light progressive contact with the record.

An object of the the present invention is to provide this belt record with a protective case which not only safeguards the record from wear and tear during handling but which also assures a correct and easy mounting and removal of the record into and from the dictating machine.

Another object is to provide a simple and economical cassette for a belt record to enable more efficient use of dictating machines of the belt record type.

Another object is to provide a mounting and control mechanism in a dictating machine for a belt record cassette which ejects the cassette as a latch is manually released and which is latched in mounted position and the machine restored to operative condition simply upon moving the cassette via a guideway into its mounted position.

These and other objects and features of the invention will be apparent from the following description and the appended claims.

In the description of our invention reference is had to the accompanying drawings, of which:

Figures 1, 2:
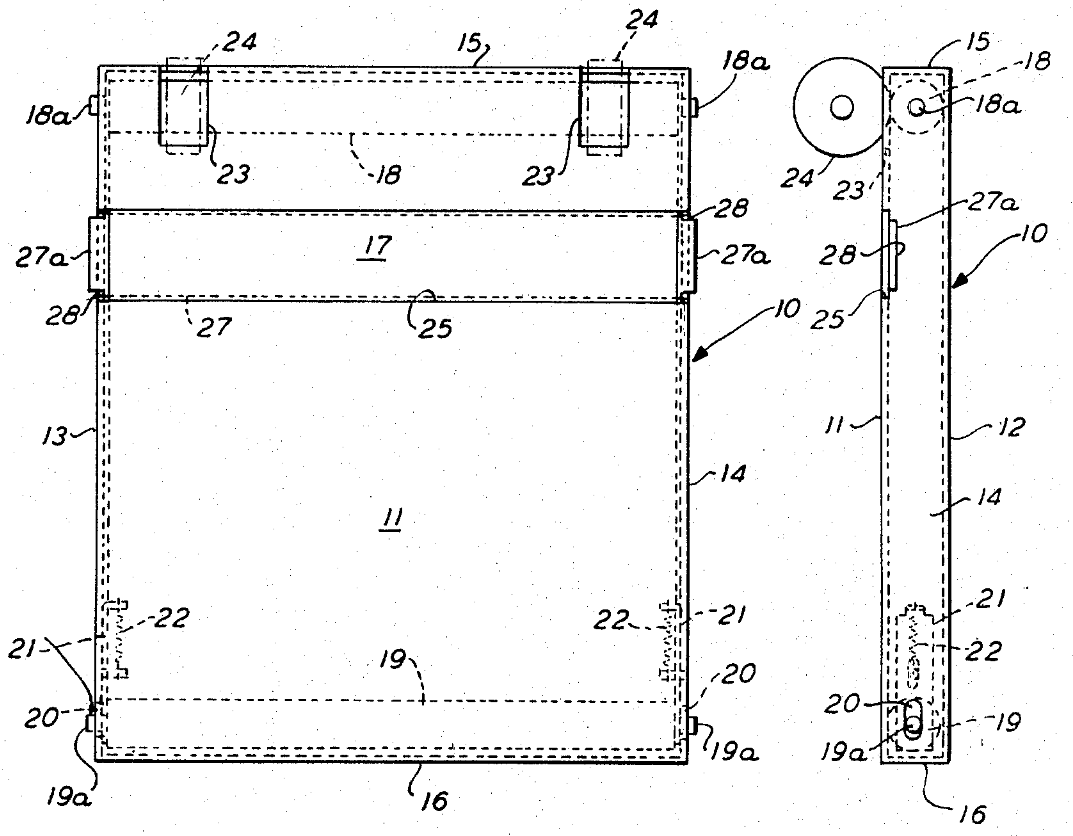
FIGS. 1 and 2 are top and side views of a preferred embodiment of the present belt record cassette.
Figure 6:
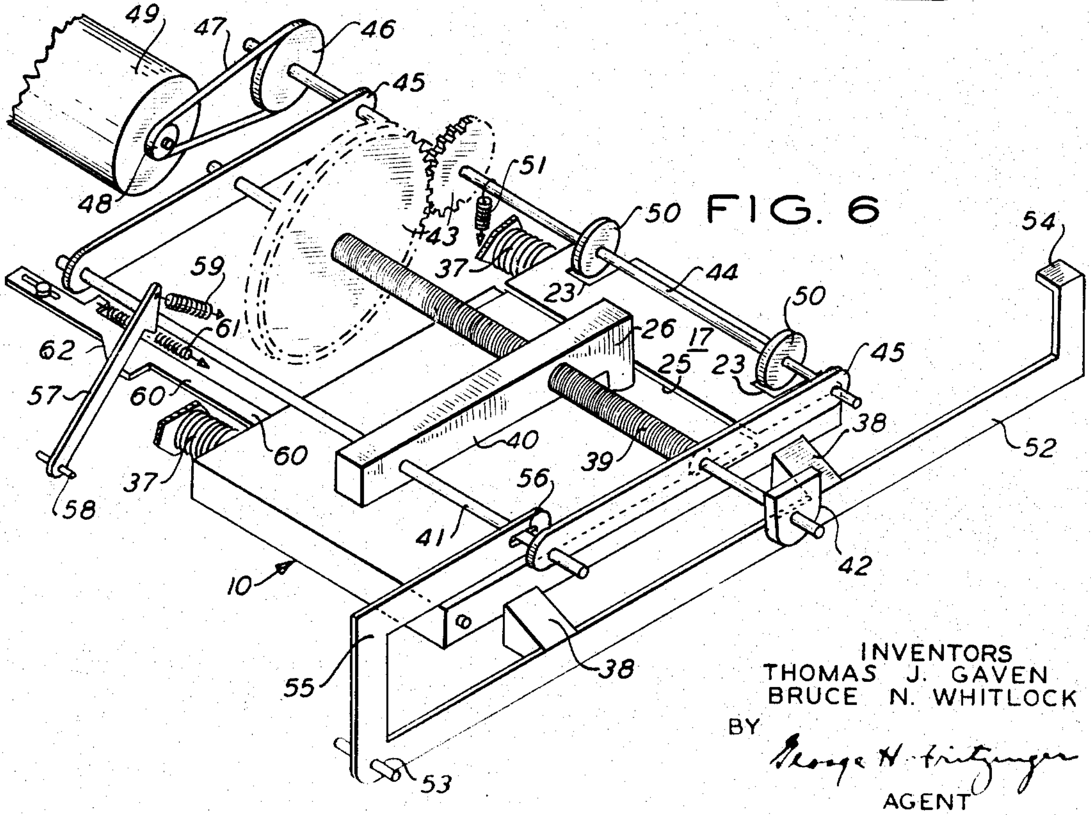
FIG. 6 is a perspective view of the dictating machine mounting and operating mechanism shown in relation to a mounted cassette.

A cassette according to the invention is shown in FIGS. 1 and 2 as comprising a flat rectangular box 10 having top and bottom walls 11 and 12, side walls 13 and 14 and end walls 15 and 16. In the cassette is a belt record 17 and a support means for the belt record comprising a drive mandrel 18 with preferably also a take-up mandrel 19. The mandrel 18 has trunnion ends 18 *a* journaled in the side walls, and the take-up mandrel 19 has trunnion ends 19 *a* extending through slots 20 in the side walls. The trunnion ends 19 *a* are journaled in small internal slide bars 21 urged by springs 22 to cause the mandrel 19 to hold the belt record in a taut condition. The top wall 11 has openings 23 exposing portions of the belt record 17 where it is trained around the drive mandrel 18. These openings permit friction drive wheels 24 to engage the record. Also, the top wall 11 has a second transverse slot 25 exposing the record for engagement by a traveling recorder-reproducer head 26 (FIG. 6). This portion of the exposed record is backed by a transverse plate 27 having reduced end extensions 27 *a* fitting in notches 28 in the side walls.

Figure 3:
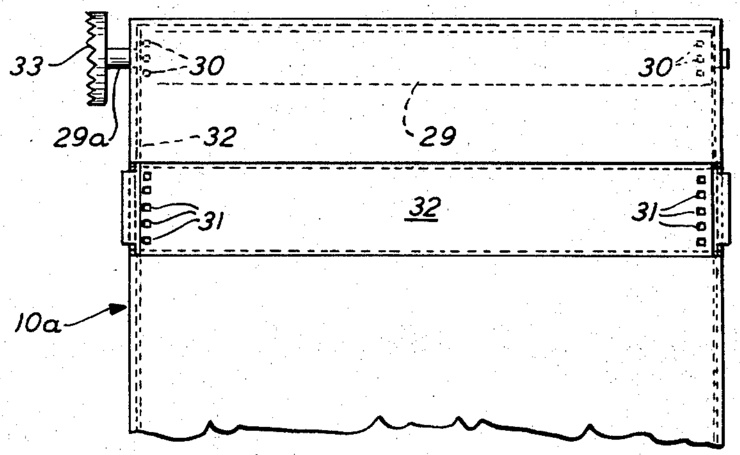
FIG. 3 is a fractional plan view of an alternative form of cassette.

In a second embodiment of cassette shown in FIG. 3 a box 10a is provided without the openings 23 and a drive mandrel 29 is provided in the box having sprocket teeth 30 engaging sprocket holes 31 in the border portions of a belt record 32. One trunnion end 29 *a* of the mandrel 29 is fitted with a drive clutch member 33—i.e., a gear or friction wheel—for engaging another similar clutch member not shown.

Figure 4:
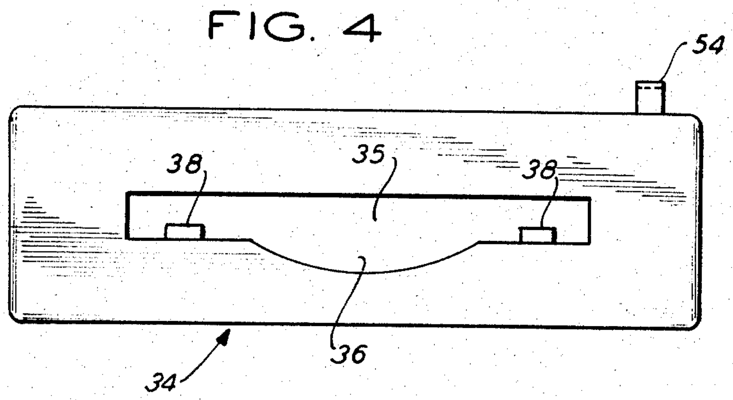
FIGS. 4 and 5 are end and top views of a dictating machine adapted for using the present cassette.
Figure 5:
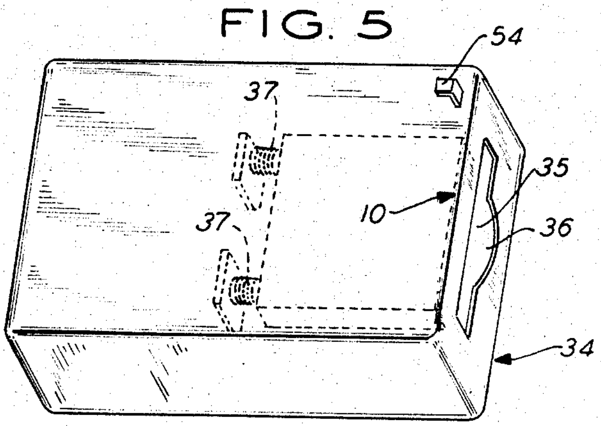

In FIGS. 4, 5 and 6 is shown fractionally one form of dictating machine 34 adapted for a cassette according to our first embodiment. This machine has an end slot 35 with finger space 36 in the lower wall thereof to enable a cassette to be pressed into a mounted position in the machine against a pair of ejection springs 37 as indicated in FIG. 5. A pair of latch members 38 shown in FIGS. 4 and 6 are released when the cassette reaches its mounted position to lock the cassette against ejection as is later described.

The operating mechanism in the dictating machine comprises a feed screw 39 threaded through a mounting arm 40 of the recorder-reproducer head 26. This mounting arm also slides on a cross rod 41. The feed screw has reduced diameter end portions journaled in bearings of which one is shown at 42. The feed screw is driven by gears 43 from a drive shaft 44. The drive shaft is journaled on a pair of rock levers 45 each pivoted on the reduced end portions of the feed screw intermediately thereof and receiving the cross rod 41 at the forward ends. A pulley 46 on one end portion of the drive shaft is coupled by a belt 47 to a drive pulley 48 on a motor 49 centered axially in relation to the feed screw 39. A pair of friction wheels 50 are secured to the drive shaft in positions overlying the opening 23 of a mounted cassette. A tension spring 51 biases the drive shaft 44 downwardly normally to hold the friction wheels 50 in engagement with the belt record where it is trained around the mandrel 18. At the same time the cross rod 41 is held in a raised position by the tilting of the rock levers 45 to tilt the mounting arm 40 clockwise about the feed screw and cause the head 26 to engage the portion of the belt record exposed via the opening 25.

The latch members 38 are mounted on a lever 52 at the right side of the cassette (FIG. 6). This lever is pivoted at 53 to a front lower portion of the machine 34 and has a finger piece 54 extending through the top wall of a right hand rearward portion of the machine. The lever 52 has a right angle arm 55 extending upwardly and then rearwardly from its hub to clear the slot 35. This arm has a horizontal slot 56 in its end portion receiving an end portion of the cross rod 41. When the finger piece 54 is depressed the cross rod 41 is lowered both to disengage the head 26 and the friction wheels 50 from the belt record, and at the same time the latch members 38 are disengaged from the cassette allowing it to be ejected by the springs 37. When the finger piece 54 is depressed to the end of its stroke the lever 52 is itself latched in operated position by a pawl 57 pivoted at 58 and moved by a bias spring 59 into latching engagement with the cross rod 41. Thus, the machine is retained in a condition ready for the remounting of another cassette thereinto.

As another cassette is inserted via the slot 35 into a mounted position in the machine it moves a slide bar 60 against force of a bias spring 61 in a leftward direction (FIG. 6). This slide bar has a cam member 62 thereon which is moved against the pawl 57 to disengage it from the cross rod 41 just when the cassette reaches a fully mounted position. This release of the latch allows the spring 51 to shift the drive shaft 44 downwardly so that the friction wheels 50 again engage the belt record. At the same time the cross rod 41 is raised to cause the head 26 to engage the record and to shift the latch lever 52 upwardly causing the latch members 38 to latch the cassette in mounted position. The machine is therefore now in condition to record on or reproduce from the mounted belt record. Further, in the handling of the cassette, both in the mounting and removal into and from the machine and in the transportation from one machine to another as well as during storage, the belt record is fully protected against being soiled or damaged in any way.

Figure 7:
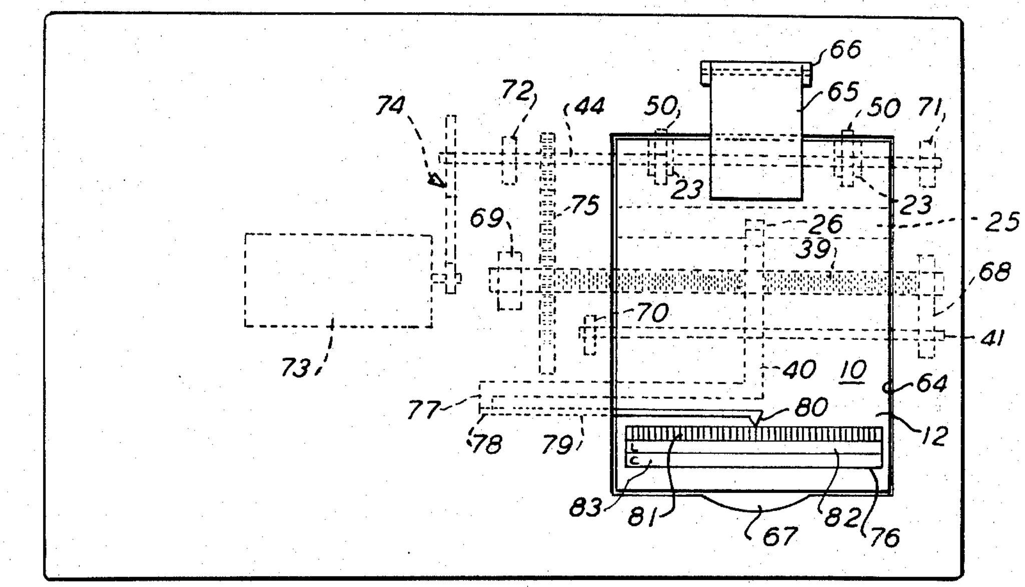
FIGS. 7 and 8 are top and front views showing a second embodiment of the machine adapted for using the cassette of FIGS. 1 and 2.
Figure 8:
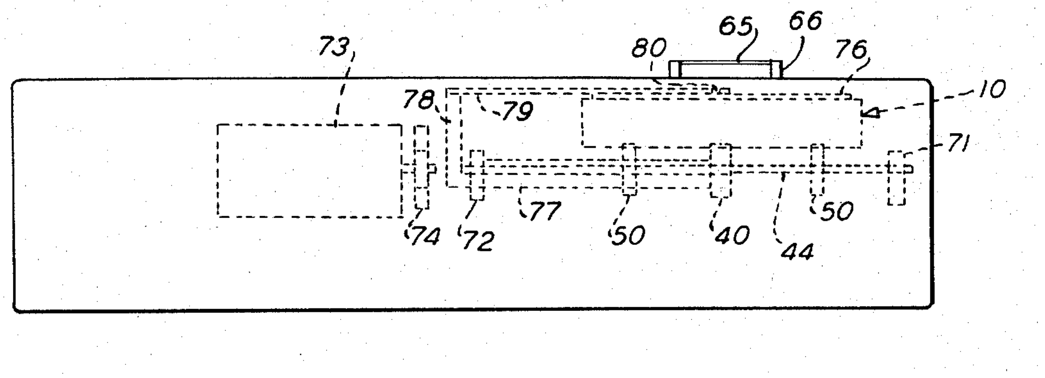

In the embodiment shown in FIGS. 7 and 8, the dictating machine has a rectangular well 64 open to the top of a size adapted to receive the cassette 10 flatwise with only a clearance fit. The cassette is dropped into the well with the openings 23 and 25 facing downwardly and at the back of the machine. After having dropped the cassette into the well, a clamp 65 hinged to a bracket 66 can be swung forwardly onto the cassette to exert downward pressure on the rear portion thereof. When it is desired to remove the cassette the clamp 65 is swung upwardly to the rear, and the cassette is picked up from the well via the finger space 67.

An operating mechanism in the machine at the bottom of the well 64 is of the character shown in FIG. 6 but faces upwardly instead of downwardly. Thus, it comprises a feed screw 39 with a head 26 facing upwardly and having a mounting arm 40 threaded on the feed screw and sliding on the guide rod 41. The feed screw 39 and guide rod 41 are fixed in bearing 68 at the right end and in respective bearings 69 and 70 at the left ends. The drive shaft 44 carries friction wheels 50 at the bottom of the well 64. This shaft is journaled in bearings 71 and 72 and is driven by a motor 73 having a belt coupling 74 with the motor. Also, the feed screw 39 has a gear coupling 75 with the drive shaft. In response to the weight of the cassette and the pressure of the clamp 65 the belt record is maintained in frictional driving engagement with the drive wheels 50 via the opening 23 and in sliding contact with the head 26 via the opening 25.

A feature of this embodiment is that an index slip 76 is mounted on the side 12 of the cassette now facing upwardly, and that an index arm or marker 77 is secured to the mounting arm 40 of the record-reproducer head 26. This index arm is of a U-shape having a leg 77 *a* extending to the left from the mounting arm 40 by the width of the cassette, then having a vertical arm 78 extending upwardly to a level above the cassette and then having a leg 79 extending to the right to a point in line with the mounting arm 40 whereat it terminates in a head, pointer or marker 80 as may be desired. The index slip may be readily replaceable as after each recording on and transcription from the belt record, or it may be of any of well known reusable types. In the simplest form, as shown, a pointer 80 is used and the slip has a scale 81 and transverse blank spaces 82 and 83 marked L and C for "length" and "correction" marks to be made as with a pencil. Such index marks are aides to the transcriber when the record is reproduced and typed. Since the index slip is mounted securely on the cassette no separate mounting of an index slip or alignment means therefor is required and no separate mounting operations for the index slip have to be carried out in setting up the machine for a recording or transcribing operation.

We claim:

1. In a dictating machine: the combination of a flat rectangular cassette containing a belt record for revolving movement therein, a housing for said machine having an open-ended slot for slidably receiving said cassette into and out of a mounted position in said housing, spring means for biasing said cassette out of mounted position in a direction outwardly of said slot, shiftable means operable for holding said cassette in a mounted position in said housing, a drive wheel for frictionally engaging the belt record of a cassette in said mounted position, a recorder-reproducer head mounted traveling movement transversely of the belt record of a cassette in said mounted position, said cassette having clearance openings to enable said drive wheel and head to engage the belt record, means mounting said head and drive wheel for a shifting movement into and out of engagement with the belt record of a cassette in said mounted position, means coupling said shiftable mounting means to said shiftable holding means for causing the head and drive wheel to engage the belt record as the shiftable holding means is operated to retain the cassette in mounted position and for disengaging the head and drive wheel from the belt record as the shiftable holding means is operated to permit said spring means to move the cassette from mounted position in a direction outwardly of said slot, wherein said holding means comprises a latch member having cam faces permitting the cassette to be moved slidably into said slot and to be therein latched when it reaches mounted position, and wherein said shiftable mounting means for said drive wheel and head comprises a rocker mounting structure coupled to said latching member for tilting said head and drive wheel out of engagement with the belt record of a cassette in mounted position as the latching member is released.

2. The dictating machine set forth in claim 1 including spring means biasing said drive wheel and head into engagement with a belt record of a cassette in said mounted position, a latch for holding said rocker system in a tilted position wherein said drive wheel and head are disengaged from said belt record, and cam means operated by the movement of a cassette through said slot into mounted position for releasing said rocker structure to permit engagement of the drive wheel and head with the belt record when the cassette reaches mounted position.

* * * * *